US008042134B2

(12) United States Patent
Hirota et al.

(10) Patent No.: US 8,042,134 B2
(45) Date of Patent: Oct. 18, 2011

(54) APPARATUS FOR MANAGING SELECTION AND DISPLAY OF GRAPHIC USER INTERFACE (GUI) INFORMATION

(75) Inventors: Atsushi Hirota, Yokohama (JP); Shinich Ooi, Oume (JP); Osamu Yoshida, Kawasaki (JP); Michihiro Fukushima, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/695,837

(22) Filed: Jan. 28, 2010

(65) Prior Publication Data

US 2010/0251310 A1 Sep. 30, 2010

(30) Foreign Application Priority Data

Mar. 30, 2009 (JP) ................ 2009-082355

(51) Int. Cl.
*G06F 3/00* (2006.01)
*G06F 13/00* (2006.01)
*G06F 3/048* (2006.01)
*H04N 5/445* (2006.01)
*H04N 5/76* (2006.01)

(52) U.S. Cl. .............. 725/45; 725/46; 725/51; 348/563; 348/564; 715/811; 386/297

(58) Field of Classification Search ............... 725/45, 725/46, 51; 348/563, 564; 715/811; 386/297
See application file for complete search history.

(56) References Cited

U.S. PATENT DOCUMENTS

2002/0054086 A1  5/2002 Van Oostenbrugge et al.
2007/0271522 A1 11/2007 Son et al.

FOREIGN PATENT DOCUMENTS

| JP | 2003-532189 | 10/2003 |
|---|---|---|
| JP | 2004-094659 | 3/2004 |
| JP | 2005-005901 | 1/2005 |
| JP | 2007-317187 | 12/2007 |
| JP | 2007-324755 | 12/2007 |
| JP | 2008-003649 | 1/2008 |

OTHER PUBLICATIONS

Tomonori Yanagiya, iGoogle Exhaustive Utilization Guide, Weekly ASCII, ASCII Media Works, Apr. 22, 2008, No. 683, pp. 46 through 51.
Manabu Kurosu, Can You Do It by VB4!? Fifth Round Wall Paper Change by VB, The BASIC, Gijutsu-Hyohron Co., Ltd., May 1, 1997, No. 167, pp. 108 through 113.
Separate Volume Booklet Windows XP Power Up, DOS/V Power Report, Impress Corporation, Apr. 1, 2002, vol. 12, No. 4, pp. 44 through 45.

*Primary Examiner* — Hoang-Vu A Nguyen-Ba
(74) *Attorney, Agent, or Firm* — Blakely, Sokoloff, Taylor & Zafman LLP (57) ABSTRACT

An information processing apparatus includes: a managing module configured to manage pieces of image information corresponding to types of applications; a determination module configured to determine whether a present time satisfies a preset temporal condition; an image selecting module configured to select first image information corresponding to a type of an activated application, and second image information corresponding to the type of the activated application when the present time satisfies the temporal condition; and a display module configured to generate a first image based on the first image information to be displayed on a display device when the image selecting module selects the first image information. The display module generates a second image based on the second image information to be displayed on the display device in place of the first image when the image selecting module selects the second image information.

13 Claims, 9 Drawing Sheets

| | SKIN 1<br>(INITIAL IMAGE) | SKIN 2<br>(CHANNEL SWITCHING IMAGE) | SKIN 3<br>(VOLUME ADJUSTMENT IMAGE) | ... | SKIN N<br>(XX IMAGE) |
|---|---|---|---|---|---|
| THEME A | | | | | |
| THEME B | | | | | |
| THEME C | | | | | |
| ... | | | | | |
| THEME M | | | | | |

FIG. 9

APPARATUS FOR MANAGING SELECTION AND DISPLAY OF GRAPHIC USER INTERFACE (GUI) INFORMATION

This application is based upon and claims the benefit of priority from Japanese Patent Application No. 2009-082355, filed Mar. 30, 2009, the entire contents of which are incorporated herein by reference.

BACKGROUND

1. Field

One embodiment of the invention relates to an information processing apparatus.

2. Description of the Related Art

The method of using a server is known as a method for reproducing or recording content data including video data, audio data, etc. in an apparatus on a network. In this method, designation of desired content data is enabled by displaying a GUI (graphical user interface) image on the display screen of a communication terminal that can communicate with the server.

For example, JP-A-2007-324755 discloses a mobile communication terminal capable of changing, according to preference of users, a user interface picture to be displayed in reproducing content data.

However, no consideration has been given to switching the user interface picture on a regular basis. For example, the apparatus disclosed in JP-A-2007-324755 is low inconvenience in that the user himself or herself needs to perform, when necessary, a manipulation of switching the user interface picture to be used in the case where plural user interface pictures are provided.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes: a managing module configured to manage pieces of image information corresponding to types of applications; a determination module configured to determine whether a present time satisfies a preset temporal condition; an image selecting module configured to select first image information corresponding to a type of an activated application from the pieces of image information, and to select second image information corresponding to the type of the activated application from the pieces of image information when the determination module determines that the present time satisfies the temporal condition after the first image information is selected; and a display module configured to generate a first image on the basis of the first image information to be displayed on a display device when the image selecting module selects the first image information; wherein the display module is configured to generate a second image on the basis of the second image information to be displayed on the display device in place of the first image when the image selecting module selects the second image information.

Figure 1:
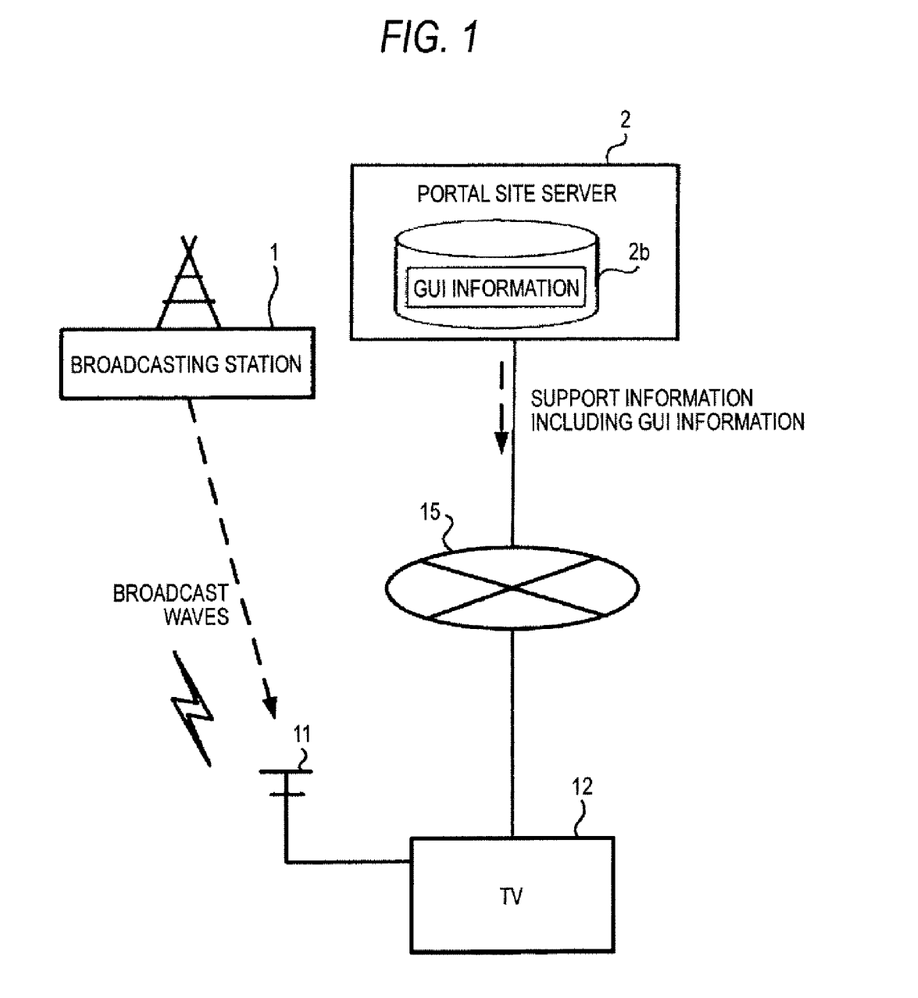
FIG. 1 is a block diagram showing an entire configuration of a digital TV broadcast system including a digital TV receiver according to an embodiment.
Figure 2:
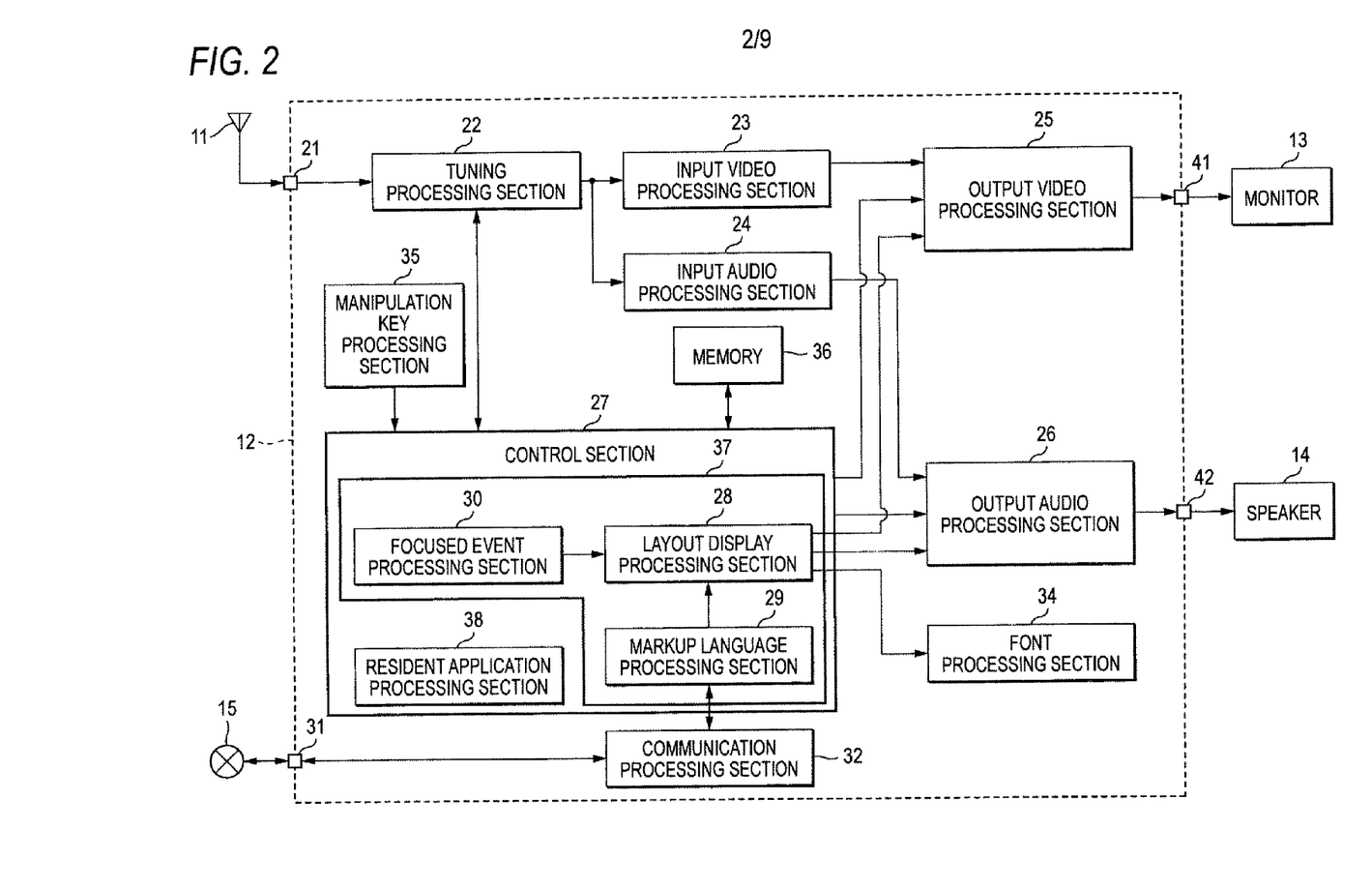
FIG. 2 is a block diagram showing the configuration of the digital TV receiver according to the embodiment.

First, the configuration of a digital TV receiver (information processing apparatus) according to the embodiment of the invention will be described with reference to FIGS. 1 and 2. FIG. 1 is a block diagram showing the entire configuration of a digital TV broadcast system including the digital TV receiver according to the embodiment. FIG. 2 is a block diagram showing the configuration of the digital TV receiver according to the embodiment.

The digital TV broadcast system shown in FIG. 1 includes a broadcasting station 1 which broadcasts digital TV broadcast waves, a digital TV receiver 12 capable of receiving broadcast waves transmitted from the broadcasting station 1 and having a function of accessing a desired server by a network communication, and a portal site server 2 which provides apparatuses connected to a network 15 with support information respectively or for particular manufacturers. The Internet protocol (IP) network 15 is a local area network (LAN) or the like. The support information may be provided by a manufacturer, etc. of the digital TV receiver 12 and, more specifically, may be graphical user interface (GUI) information to be used for generating a GUI image corresponding to an application that functions in the digital TV receiver 12. The support information may be apparatus maintenance information, apparatus-related information such as function information, or the like. In the embodiment, the portal site server 2 is equipped with a database 2b storing pieces of GUI information.

Next, the configuration of the digital TV receiver 12 according to the embodiment will be described with reference to FIG. 2. As shown in FIG. 2, in the digital TV receiver 12, TV broadcast signals received by an antenna 11 are supplied to a tuning processing section 22 via an input terminal 21. The tuning processing section 22 selects a TV signal on a desired broadcast channel from the received TV broadcast signals and outputs the selected TV signal to an input video processing section 23 and an input audio processing section 24.

The input video processing section 23 performs decoding processing on the video component of the received TV signal to restore video signals of respective fields or frames and outputs those signals to an output video processing section 25. The input audio processing section 24 performs decoding processing on the audio component of the received TV signal to restore an audio signal and outputs it to an output audio processing section 26.

A control section 27 supervises all operations of the digital TV receiver 12 including operations to be described below. A manipulation key processing section 35 is connected to the control section 27, and the control section 27 receives manipulation information from the manipulation key processing section 35 and controls the individual circuit sections so that their operations reflect the manipulation content.

Equipped with a browser processing section 37 and a resident application processing section 38, the control section 27 performs any of various kinds of processing by activating the corresponding one of application programs such as menu picture generation software, a Hyper Text Markup Language (HTML) software, a Broadcast Markup Language (BML) software, an image quality/audio parameter adjustment software, a program table generation software, and a program recording reservation software which are stored in a memory 36, and causes a monitor 13 to display a generated GUI image via the output video processing section 25.

The menu picture generation software is a program for generating a menu picture for display of link information etc. The HTML software is a program for processing data that is written in the HTML format. The BML software is a program for processing data that is written in the BML format. The image quality/audio parameter adjustment software is a program for adjusting the image quality parameters of a video signal and the audio parameters of an audio signal. The program table generation software is a program for generating a program table picture on the basis of program table information received from the broadcasting station 1. The program recording reservation software is a program for generating recording reservation information for a broadcast program to be transmitted from the broadcasting station 1.

The browser processing section 37 of the embodiment, which consists of a layout display processing section 28, a markup language processing section 29, and a focused event processing section 30, deciphers content data which is written in a markup language and reproduces a layout.

Figure 3:
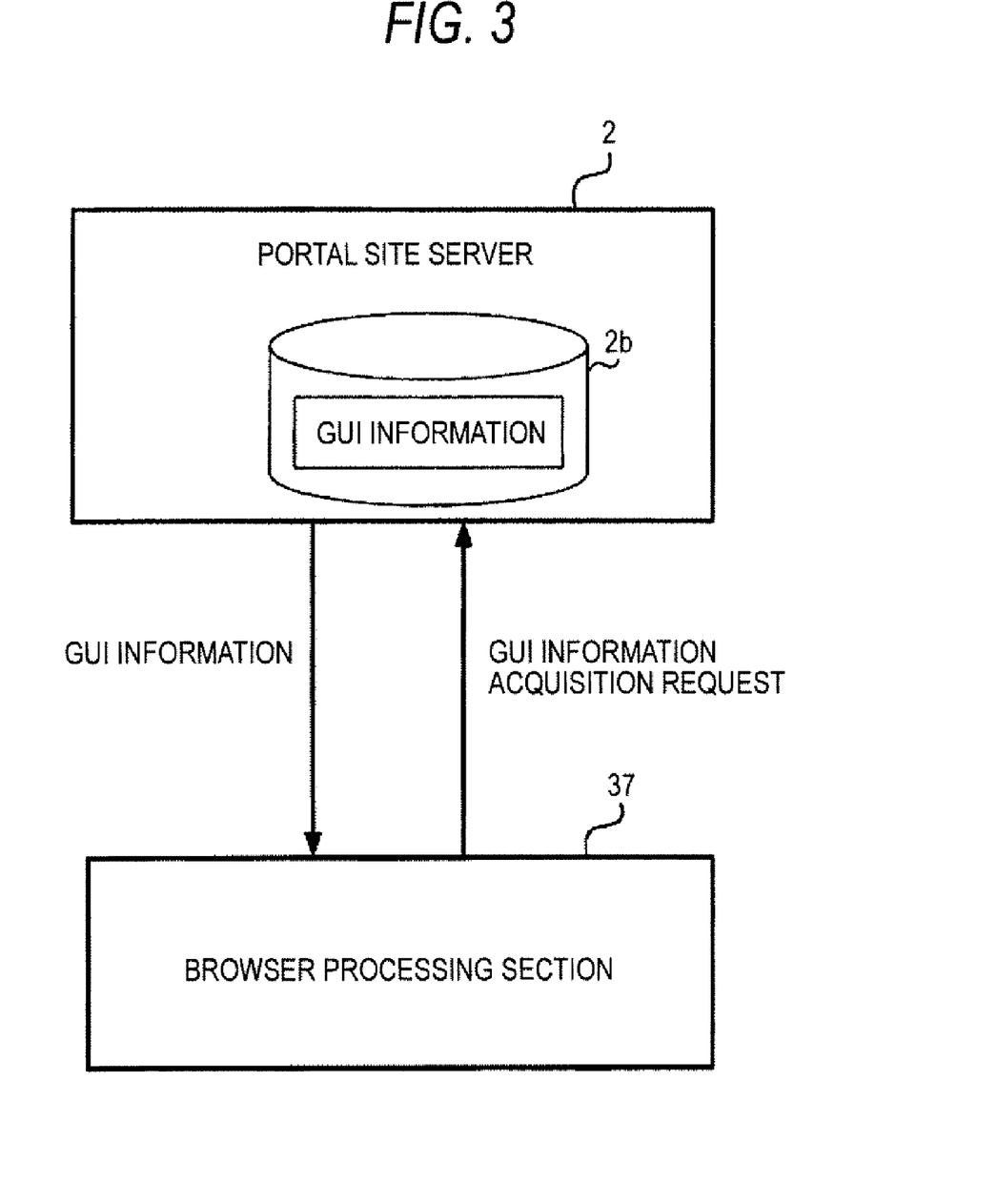
FIG. 3 shows a GUI information acquiring function of a browser processing section.

The browser processing section 37 can generate a request for access to the network 15 and send it to the network 15 via a communication processing section 32 and a connection terminal 31. For example, as shown in FIG. 3, the browser processing section 37 can connect to the portal site server 2 via the network 15 and send the portal site server 2 a request for acquisition of GUI information stored in the database 2b. In the embodiment, the resident application processing section 38 performs GUI display processing of a resident application for EPG display, menu setting, audio adjustment, or the like) using internal data of the digital TV receiver 12. With the above configuration, in the embodiment, desired GUI information can be acquired properly.

Figure 4:
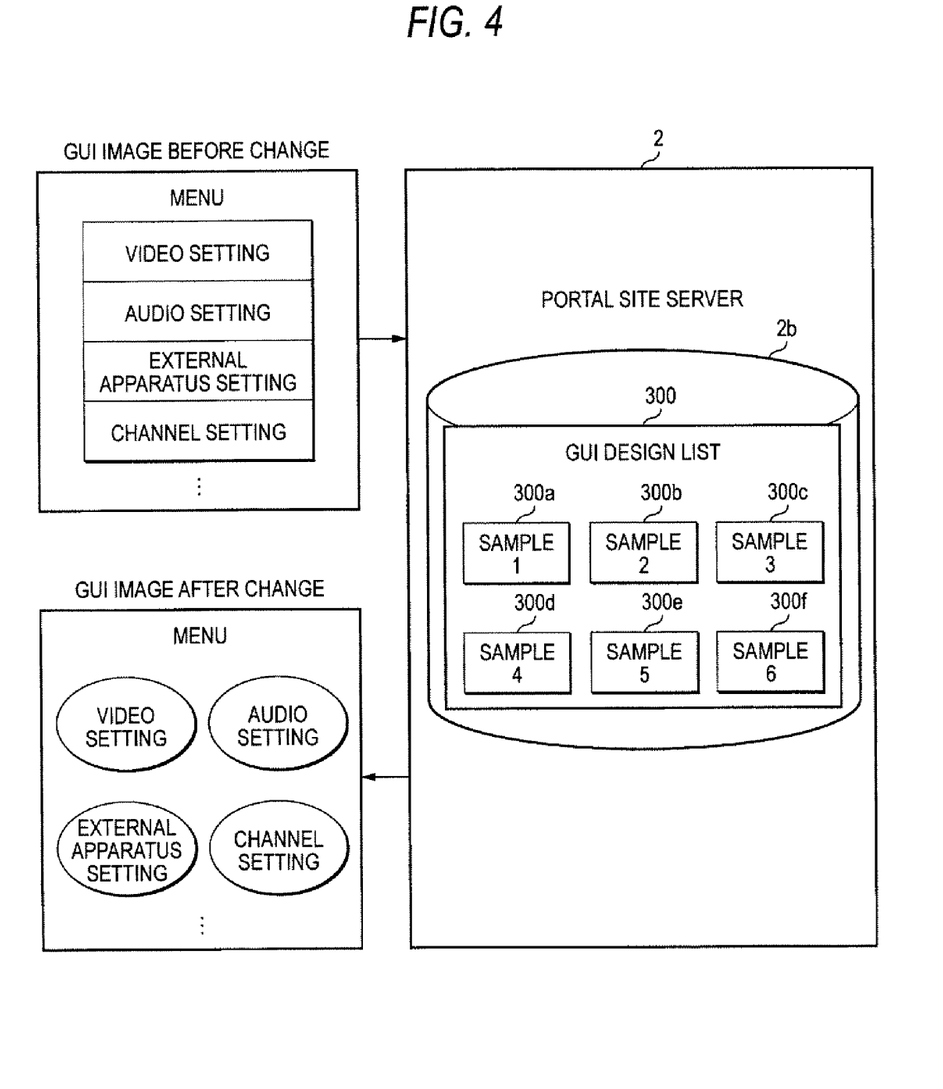
FIG. 4 shows a flow of switching current GUI images to GUI images that have been generated on the basis of GUI information transmitted from a portal site server in the embodiment.

Next, example processing for switching and updating GUI information will be described with reference to FIG. 4. FIG. 4 shows a flow of switching current GUI images to GUI images that have been generated on the basis of GUI information transmitted from the portal site server 2.

As shown in FIG. 4, the browser processing section 37 of the embodiment can connect to the portal site server 2 via the network 15 and refer to a provided GUI information list that is stored in the database 2b of the server 2. For example, multiple GUI designs 300a-300f are contained in the provided GUI information list 300. The browser processing section 37 can acquire GUI information for generating a GUI image according to a desired one of the GUI designs 300a-300f by selecting and determining the desired design and update a current GUI image to a new one. In this manner, the embodiment provides the function for switching between a variety of GUI images that are respectively generated on the basis of plural pieces of GUI information, and thereby realizes very fine customization of the switching between GUI images.

Although the above description assumes that GUI information is acquired from the portal site server 2, the invention is not limited to such a case. For example, GUI information may be stored in advance in the memory 36 or added from an external apparatus (not shown) other than the portal site server 2 using a detachable flash memory or the like.

Returning to FIG. 2, content data acquired from the network 15 is supplied to the markup language processing section via the connection terminal 31 and the communication processing section 32. The markup language processing section 29 analyzes the markup language of the received content data and outputs an analysis result to the layout display processing section 28.

The layout display processing section 28 generates bitmap information to be displayed on the basis of the received analysis result and outputs it to the output video processing section 25. Furthermore, the layout display processing section 28 generates an audio signal of effect sound etc. and outputs it to the output audio processing section 26. Connected to a font processing section 34, the layout display processing section 28 performs character drawing by reading necessary information from the font processing section 34 in generating a bitmap video signal.

The focused event processing section 30 is connected to a manipulation key processing section 35 for generating manipulation information on the basis of key information that is input through a manipulation unit (not shown) including a remote controller. The focused event processing section 30 outputs, to the layout display processing section 28, information relating to a layout change corresponding to the manipulation information received from the manipulation key processing section 35. For example, if information relating to a layout change is output to the layout display processing section 28, an image in which focusing is made on a prescribed icon is displayed on the display screen. This allows the user to visually recognize an icon selected and designated by himself or herself.

The output video processing section 25 converts the bitmap information supplied from the layout display processing section 28 into a video signal. The output video processing section 25 outputs, to the monitor 13, via an output terminal 41, a selected one of the video signal supplied from the input video processing section 23 and the video signal obtained by converting the bitmap information (or the two video signals may be displayed in superimposition), and thereby causes the monitor 13 to display video.

The output audio processing section 26 outputs, to speakers 14, via an output terminal 42, a selected one of the audio signal supplied from the input audio processing section 24 and the audio signal supplied from the layout display processing section (or the two audio signals may be output in superimposition), and causes the speakers 14 to reproduce audio.

The memory 36 may include a read-only memory (not shown) which is stored with application programs to be run by the control section 27, a random access memory (not shown) which provides a work area for the control section 27, a nonvolatile memory (not shown) which is stored with various kinds of setting information, control information, etc., and other memories.

Figure 5:
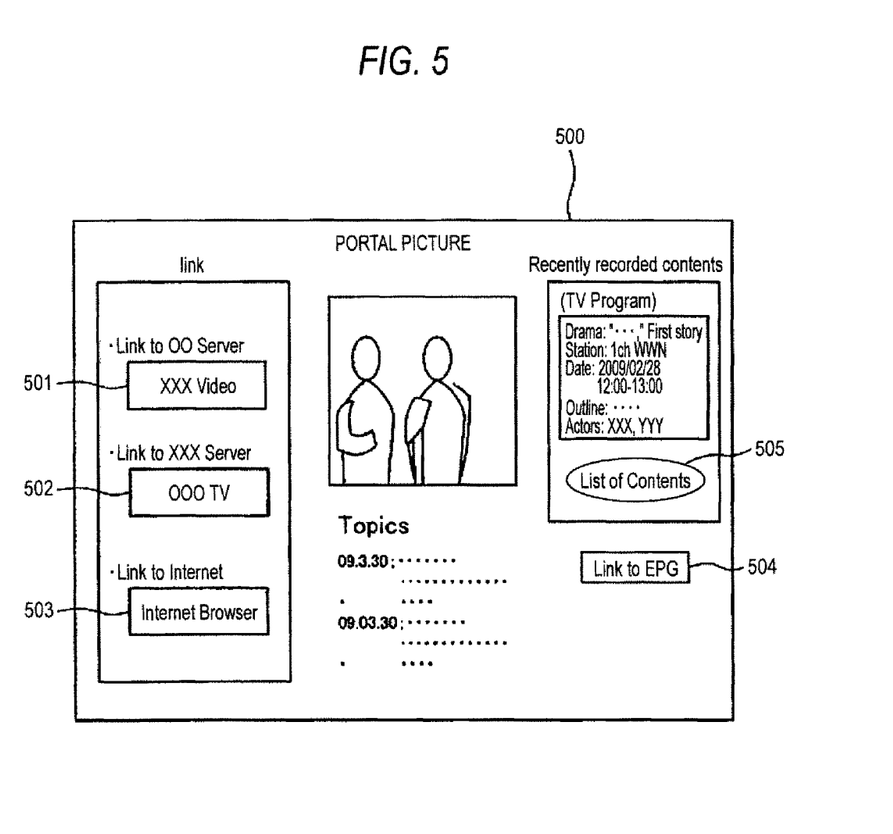
FIG. 5 shows an example portal picture used in the embodiment.

Furthermore, in the embodiment, as shown in FIG. 5, for example, pieces of link information for connection to other servers (not shown) on the network 15 and other information can be displayed in a menu picture or a portal picture that is generated on the basis of information supplied from the portal site server 2. FIG. 5 shows an example portal picture used in the embodiment. The portal picture 500 shown in FIG. 5 contains icons 501 and 502 for connection to external servers, an icon 503 for connection to the Internet, a link icon 504 for an electronic program guide, an icon 505 for display of a list of recorded content data, and other information. In the embodiment, the designs of the portal picture 500 itself and these individual icons can be switched properly.

Figure 6:
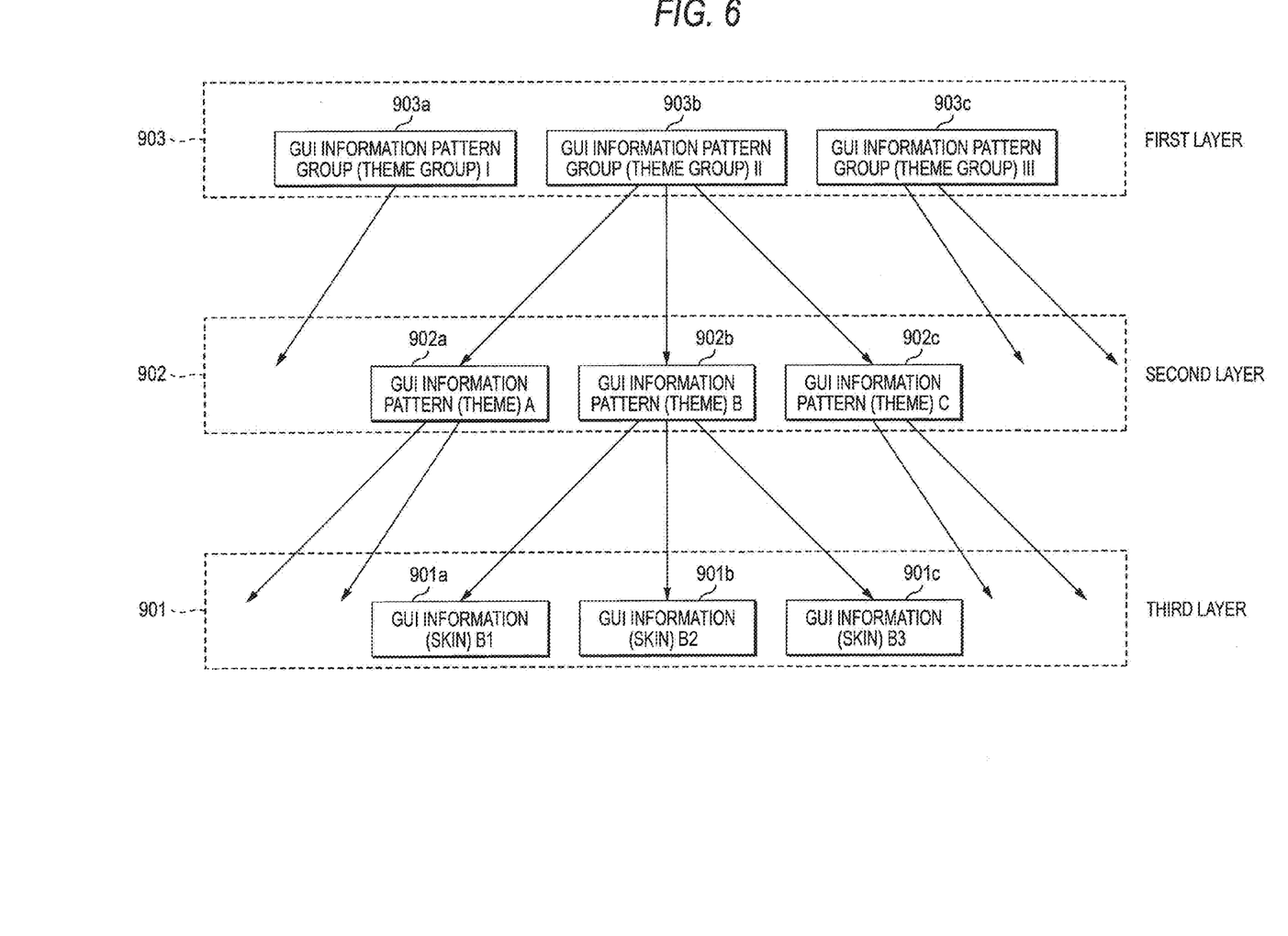
FIG. 6 shows an example storage form of pieces of GUI information which are managed in the digital TV receiver according to the embodiment.
Figure 7:
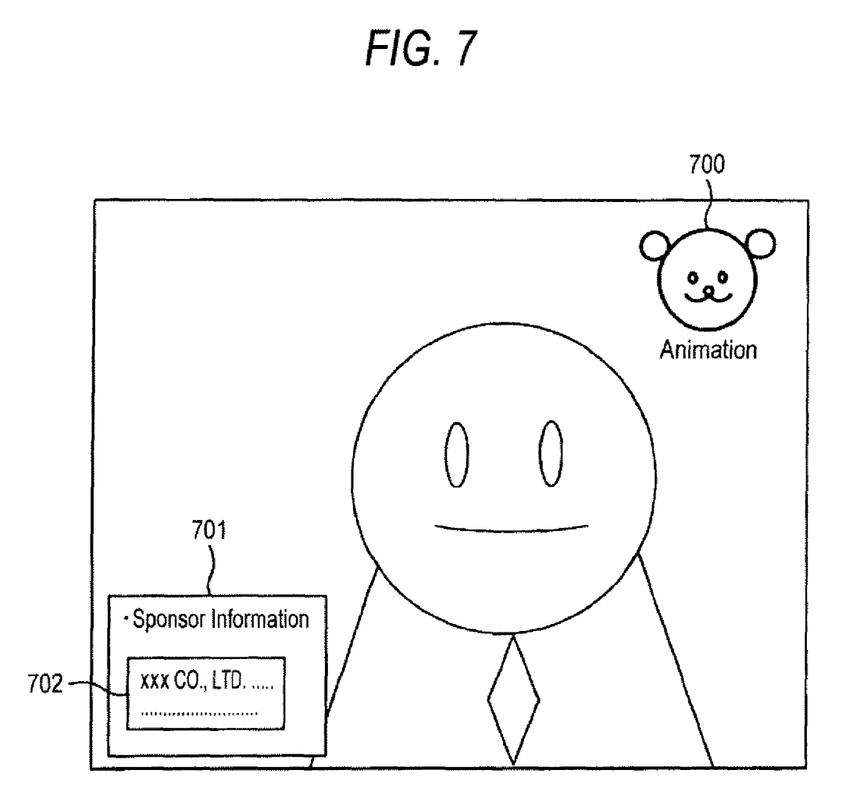
FIG. 7 shows example GUI images used in the embodiment.
Figure 8:
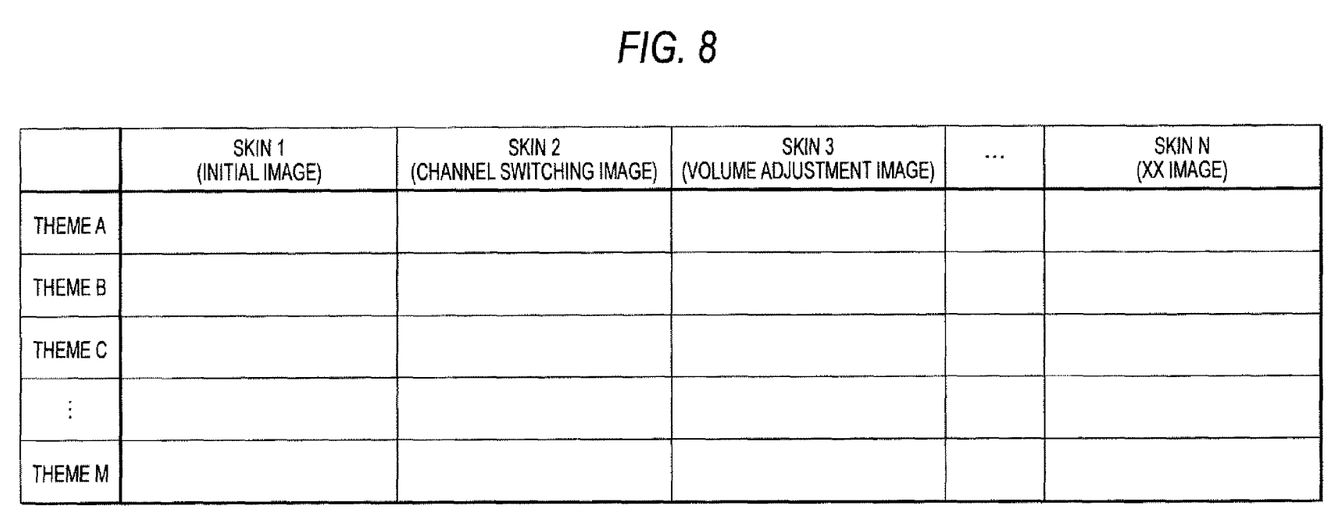
FIG. 8 shows an example management form of pieces of GUI information used in the digital TV receiver according to the embodiment.
Figure 9:
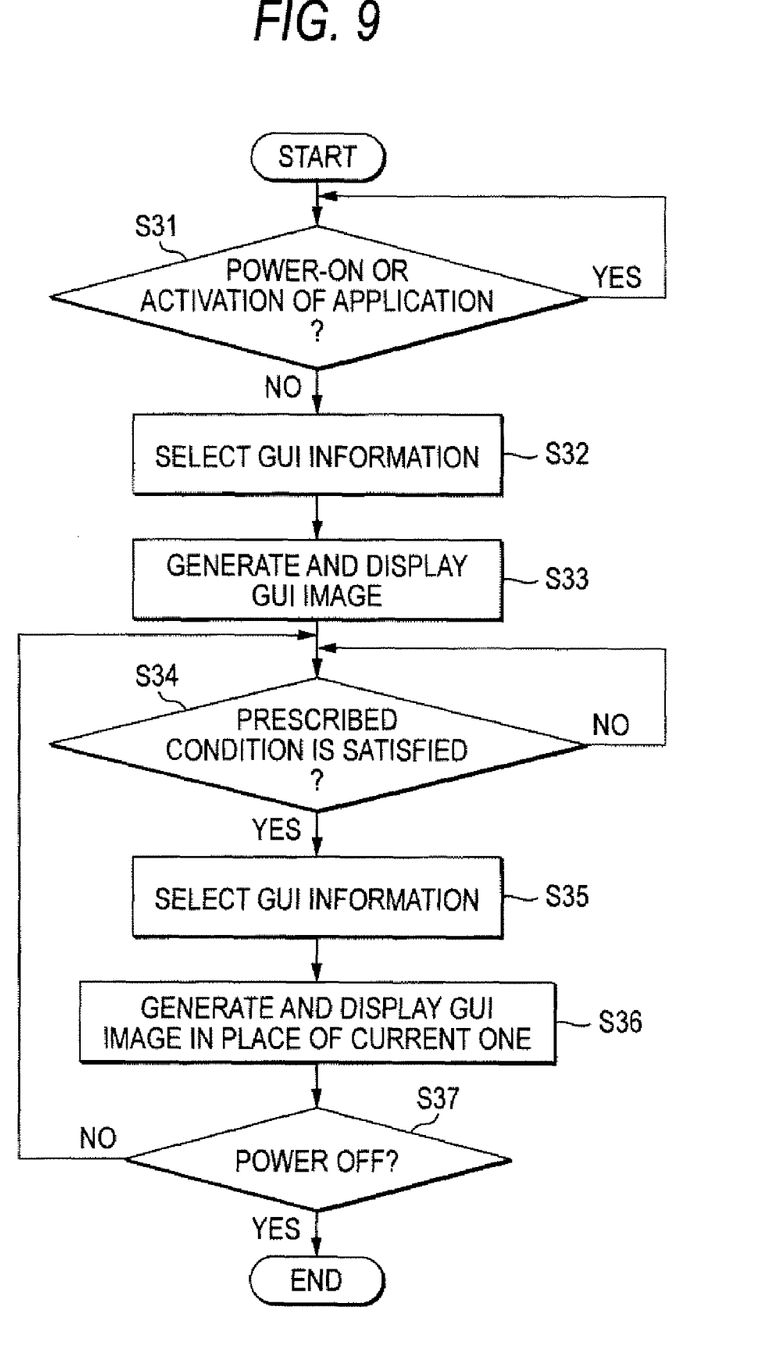
FIG. 9 is a flowchart of an example operation of the digital TV receiver according to the embodiment.

Next, the operation of the digital TV receiver 12 according to the embodiment will be described with reference to FIGS. 6-9. FIG. 6 shows an example storage form of pieces of GUI information which are managed in the digital TV receiver 12. FIG. 7 shows example GUI images used in the embodiment. FIG. 8 shows an example management form of pieces of GUI information used in the information processing apparatus 12. FIG. 9 is a flowchart of an example operation of the digital TV receiver 12.

The operation of the digital TV receiver 12 according to the embodiment will be described below with reference to the flowchart of FIG. 9. First, if power-on processing or processing of activating a prescribed application is performed at step S31, at step S32 the control section 27 of the digital TV receiver selects GUI information of an application category corresponding to the processing performed.

In the digital TV receiver 12, pieces of GUI information are managed while being stored in the memory 36 such as a ROM (not shown) or an NVRAM (not shown). For example, in the embodiment, pieces of GUI information are managed in a three-layer structure or a two-layer structure.

As shown in FIG. 6, in the digital TV receiver 12, in order to generate GUI images such as an initial GUI image or an audio adjustment picture for display to the user and for the user's manipulation, pieces of GUI information (skins) 901a-901c which are generated for respective applications, pieces of GUI information patterns (themes) 902a-902c, each of which is a group of pieces of GUI information of the same application category, and GUI information pattern groups (theme groups) 903a-903c each of which is a group of interrelated GUI information patterns are managed and stored as a first layer 901, a second layer 902, and a third layer 903, respectively.

A processing flow of step S32 will be described below in detail. First, the control section 27 selects a theme or a theme group corresponding to the application that is currently running in the digital TV receiver 12 from the data in the second layer 902 or the third layer 903 that are managed being stored in the memory 36. Then, the control section 27 selects a skin that belongs to the selected theme in the second layer 902 or the selected theme group in the third layer 903.

In performing the above skin selection processing, the digital TV receiver 12 functions to perform selection processing on the basis of a genre code of a broadcast program being currently played-back (displayed), to perform random selection using quasi-random numbers, or to perform each-time-selection processing according to GUI information order that has been arbitrarily set by the user of the digital TV receiver 12 or a manager of the portal site server 2. The switching between GUI images may be customized more finely by combining the above respective functions as appropriate.

With this function, the digital TV receiver 12 can present a different skin every time power-on processing or application activation processing is performed and thereby makes it possible to customize the switching between GUI images finely according to the user's preference.

Example GUI images to be displayed in the digital TV receiver 12 according to the embodiment will be described below with reference to FIG. 7. In the example of FIG. 7, a GUI image 700 selected on the basis of a genre code of a broadcast program (in this example, an animation program), a GUI image 701 for presenting information relating a program sponsor, a GUI image 702 for presenting advertisement information, and other information are displayed. The embodiment is provided with a function of selecting a GUI image relating to each broadcast program from the data in the first layer 901 or the second layer 902 by extracting a genre code from SI information, for example. This function allows the user to recognize a genre of a program being viewed currently. When multiple GUI image candidates are available for an extracted genre code, one GUI image may be selected randomly using quasi-random numbers.

Although in the above example the GUI image 700 is selected on the basis of the genre code of the broadcast program, the invention is not limited to such a case. When a given application has been activated, a GUI image may be selected randomly using quasi-random numbers or selected according to GUI information order that was arbitrarily set in advance by the user of the digital TV receiver 12, the manager of the portal site server 2, or a like person. This measure not only enables customization suitable for the preferences of the user, or customization by a service provider such as the manager of the portal site server 2, but also can give a surprise to the user by presenting an unexpected image to the user. In the embodiment, in the case where quasi-random numbers are used, selection is made from a theme or a theme group whose constituent elements have a certain interrelationship. However, the invention is not limited to such a case.

The GUI image 701 which presents information relating to a program sponsor and the GUI image 702 which presents advertisement information may be displayed together with content data video in such a manner as not to obstruct viewing of the content data video. This measure makes it possible to present, to the user, an advertisement of a sponsor or service information from a sponsor during viewing of content data video.

As described above, in the embodiment, the user of the digital TV receiver 12 or the manager of the portal site server 2 may determine GUI information order in advance. For example, the control section 27 can refer to a skin to be selected next by managing information indicating given order of pieces of GUI information stored in the memory 36 in the form of an M-row/N-column table (see FIG. 8).

In the embodiment, the table shown in FIG. 8 may be presented to the user. This measure allows the user to easily recognize the order of pieces of GUI information. In the table shown in FIG. 8, the pieces of information contained in the respective boxes can be changed individually. This allows the user or the manager of the portal site server 2 to modify or update each piece of GUI information as appropriate when trouble has occurred with it.

In the embodiment, the display periods and the order of pieces of GUI information are limited to a certain extent as long as a service provider such as the manager of the portal site server 2 employs the above-described features together with time-related conditions. For example, GUI images generated taking audience ratings and time slots into consideration such as GUI images relating to a current season, GUI images for a campaign in a certain period, and advertisement posters generated for advertisement in high-audience-rating time slots can be displayed with proper timing.

In the embodiment, if a theme group in the third layer 903 is selected first, a skin belonging to the selected theme group may be selected directly. Alternatively, processing of selecting a skin may be performed after a theme belonging to the selected theme group is selected according to the above-described selection method.

Returning to FIG. 9, after GUI information is selected at step S32, at step S33 the control section 27 generates a GUI image on the basis of the selected GUI information and causes the monitor 13 to display the generated GUI image.

At step S34, the control section 27 checks, on a regular basis, whether the current operation status of the digital TV receiver 12 satisfies a prescribed condition. For example, the prescribed condition may be a temporal condition (e.g., a year and a date, a day of the week, a time, or an elapsed time from execution of preceding switching processing) that was arbitrarily set in advance by the user of the digital TV receiver 12 or the manager of the portal site server 2 or a condition that particular processing (trigger processing) such as processing of receiving a command designating a specified channel or processing of displaying a specified broadcast program has been performed.

Where a temporal condition is employed as the prescribed condition, GUI images that vary regularly can be presented to the user. Furthermore, combining the temporal condition with the skin selecting function as appropriate (mentioned above) can provide an appropriate advertisement effect.

Where a condition that particular processing such as processing of receiving a command designating a specified channel or processing of displaying a specified broadcast program has been performed is employed as the prescribed condition, the user can easily recognize a channel or a broadcast program of current viewing. Furthermore, combining such a condition with the skin selecting function as appropriate (mentioned above) can give an appropriate advertisement effect to a broadcasting station or a sponsor of a broadcast program.

Returning to FIG. 9, if it is determined that the current operation status of the digital TV receiver 12 satisfies the prescribed condition (S34: yes), at step S35 the control section 27 selects another GUI information that belongs to the same category as of the application being i in operation. At step S35, GUI information is selected in the same manner as at step S32. The embodiment is provided with a function of storing the number of times each skin has been employed so far in the switching processing and eliminate, from future replacement candidates, skins that have been employed in the switching processing a prescribed times or more. This function prevents an event that the same skin is employed too many times and an event that a skin generated only for an initial use is selected later. A skin that has been employed a relatively small number of times so far may be employed by utilizing this function. As such, the embodiment makes it possible to present fresh GUI images to the user.

After new GUI information is selected at step S35, at step S36 the control section 27 generates a new GUI image on the basis of the newly selected GUI information and causes the monitor 13 to display the new GUI image in place of the current one.

Finally, at step 337, the control section 27 checks, on a regular basis, whether a power-off command has been received. If no power-off command has been received yet (S37: no), the process returns to step S34. If a power-off command has been received (S37: yes), the process is finished.

As described above, the digital TV receiver 12 according to the embodiment has the function of switching GUI images on a regular basis. By virtue of this function, in the digital TV receiver 12, different skins can be presented to user while switching is made between them on a regular basis. As a result, the switching between GUI images can be customized finely according to the tastes of the user. As such, the digital TV receiver 12 according to the embodiment can increase the convenience of the user in terms of the manipulation of switching between user interface images.

The digital TV receiver 12 of the content data delivery system according to the embodiment has the function of acquiring GUI information generated by the portal site server 2. Acquiring GUI information from an external server in this manner makes it possible to flexibly generate proper GUI information according to a change in the configuration and the functions of a home network, a request from the user, an update made by the user, or the like.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus adapted to store software modules in a non-transitory readable storage medium, comprising:

a managing module configured to divide graphical user interface (GUI) information for generating GUI images, which corresponds to applications, into at least a first group GUI information pattern or a GUI information pattern group, and a second group GUI information, and configured to manage the first group GUI information pattern or the GUI information pattern group and the second group GUI information as hierarchical structure information, wherein the first group GUI information pattern or the GUI information pattern group is related for each of types of applications, and the second group GUI information is interrelated for each of the first group GUI information pattern or the GUI information pattern group, a determination module configured to determine whether a present time satisfies a preset temporal condition;

an image selecting module configured to, from GUI information managed by the managing module in response to activation of an application of the applications, select first GUI information belonging to the first group or the second group corresponding to a type of the activated application and to newly select second GUI information belonging to the first group or the second group corresponding to the type of the activated application when the determination module determines that the present time satisfies the preset temporal condition after the first GUI information is selected; and a display module configured to generate a first GUI image on the basis of the first GUI information to display the first GUI image on a display device when the image selecting module selects the first GUI information, and configured to generate a second GUI image on the basis of the second GUI information to display the second GUI image on the display device in place of the first GUI image when the image selecting module selects the second GUI information.

2. The apparatus of claim 1, wherein the image selecting module is configured to select the second GUI information when a certain time has elapsed from a time when the first GUI information is selected.

3. The apparatus of claim 2, wherein the image selecting module is configured to select the second GUI information when at least one of power re-application processing or processing of re-activating the application is performed after the first GUI information is selected.

4. The apparatus of claim 3, further comprising:
a broadcast wave receiving module configured to receive broadcast waves from a broadcasting station; and
an input module configured to receive a manipulation input;
wherein the image selecting module is configured to select the second GUI information in accordance with at least one of processing for tuning in to a given channel according to the manipulation input or processing of displaying a certain broadcast program after the image selecting module selects the first GUI information.

5. The apparatus according to claim 4, wherein the image selecting module is configured to select the first GUI information and the second GUI information by referring to a genre code of a broadcast program being displayed currently.

6. The apparatus of claim 5, wherein the display module is configured to control the display device to display the second GUI image in place of the first GUI image correspondingly to a first power application on a date that satisfies the temporal condition when the temporal condition does not include a specified time.

7. The apparatus of claim 6, wherein the image selecting module is configured to select at least one of the first GUI information and the second GUI information by using quasi-random numbers.

8. The apparatus of claim 7, wherein the image selecting module is configured to sequentially select the first GUI information and the second GUI information from pieces of image information in accordance with a designation through the input module.

9. The apparatus of claim 8, wherein the image selecting module is configured to refer to the number of times each of the GUI information managed by the managing module has been selected, and to remove GUI information that has been selected a given number of times or more from future selection.

10. The apparatus of claim 9, wherein the image selecting module is configured to select, GUI information belonging to the first group or the second group corresponding to a type of the activated application, as the second GUI information.

11. The apparatus of claim 10, wherein the GUI information managed by the managing module includes URL information indicating a location of a resource on the Internet; and the display module is configured to generate a GUI image that enables access to the resource by using the URL information, and display the GUI image on the display device.

12. The apparatus of claim 11, wherein the first group GUI information pattern or the GUI information pattern group is configured by theme information related to each of the types of applications, and the second group GUI information is configured by skin information interrelated to each of the theme information, and
wherein the managing module is configured to manage the theme information and the skin information by dividing the types of the applications as groups where the types of the applications are interrelated with each other.

13. An information processing apparatus comprising:
a receiver configured to receive broadcast waves;
an input module configured to receive a manipulation input;
a managing module configured to divide graphical user interface (GUI) information for generating GUI images, which corresponds to applications, into at least a first group GUI information pattern or a GUI information pattern group, and a second group GUI information, and configured to manage the first group GUI information pattern or the GUI information pattern group and the second group GUI information as hierarchical structure information, wherein the first group GUI information pattern or the GUI information pattern group is related for each of types of applications, and the second group GUI information is interrelated for each of the first group GUI information pattern or the GUI information pattern group,
an image selecting module configured to select first GUI information belonging to the first group or the second group managed by the managing module, and to newly select second GUI information belonging to the first group or the second group managed by the managing module, in accordance with at least one of processing for tuning in to a given channel according to the manipulation input or processing of displaying a certain broadcast program, after the image selecting module selects the first GUI information;
a display module configured to generate a first image on the basis of the first GUI information to display the first image on a display device when the image selecting module selects the first GUI information, and configured to generate a second image on the basis of the second GUI information display the second GUI image on the display device in place of the first GUI image when the image selecting module selects the second GUI information.

* * * * *